United States Patent [19]

Gupta et al.

[11] Patent Number: 5,305,832

[45] Date of Patent: Apr. 26, 1994

[54] METHOD FOR FRACTURING HIGH TEMPERATURE SUBTERRANEAN FORMATIONS

[75] Inventors: D. V. Satyanarayana Gupta, The Woodlands; Vernon L. Franklin, Spring, both of Tex.

[73] Assignee: The Western Company of North America, Houston, Tex.

[21] Appl. No.: 993,405

[22] Filed: Dec. 21, 1992

[51] Int. Cl.$^5$ ............................................. E21B 43/267
[52] U.S. Cl. ..................................... 166/300; 166/308; 252/8.551
[58] Field of Search ......................... 166/271, 300, 308; 252/8.551

[56] References Cited

U.S. PATENT DOCUMENTS

| | | | |
|---|---|---|---|
| 3,948,325 | 4/1976 | Winston et al. | 166/308 |
| 4,110,230 | 8/1978 | Hessert et al. | 252/8.551 |
| 4,477,360 | 10/1984 | Almond | 252/8.551 |
| 4,488,975 | 12/1984 | Almond | 252/8.551 |
| 4,534,870 | 8/1985 | Williams | 252/8.551 |
| 4,579,670 | 4/1986 | Payne | 252/8.551 |
| 4,692,254 | 9/1987 | Kucera | 252/8.551 |
| 4,702,848 | 10/1987 | Payne | 252/8.551 |
| 4,801,389 | 1/1989 | Brannon et al. | 252/8.551 |
| 5,067,566 | 11/1991 | Dawson | 166/308 |
| 5,103,913 | 4/1992 | Nimerick et al. | 166/308 |

FOREIGN PATENT DOCUMENTS

0371616A1 6/1990 European Pat. Off. .

OTHER PUBLICATIONS

"*Gravity Concentration to Hydrogen Energy*" Kirk-Othmer Encyclopedia of Chemical Technology, Third Edition, vol. 12, pp. 58,62,63 Wiley-Interscience Publication, New York, USA.

*Primary Examiner*—George A. Suchfield
*Attorney, Agent, or Firm*—Peter A. Bielinski

[57] ABSTRACT

A method for hydraulic fracturing using crosslinked guar polymers wherein the high temperature viscosity and thermal stability of said polymers is maximized by adjusting the pH such that the cationic charge density of the polymer is at its maximum. These maximums occur for guar at a pH of 10.5 and for carboxymethylhydroxypropyl guar at a pH of 10.7.

14 Claims, No Drawings

METHOD FOR FRACTURING HIGH TEMPERATURE SUBTERRANEAN FORMATIONS

BACKGROUND OF THE INVENTION

This invention relates to the hydraulic fracturing of high temperature subterranean formations. More particularly it relates to a method for fracturing subterranean formations penetrated by a well bore, wherein a fluid composition is injected into a formation through a suitable conduit at a rate and pressure sufficient to produce a fracture in the formation. It is well known that production in petroleum, natural gas and geothermal wells can be greatly enhanced by hydraulic fracturing techniques. These techniques are known in the art and generally comprise introducing an aqueous solution of a water-soluble polymer (e.g. Guar Gum) in which "proppants" (e.g. coarse sand or sintered bauxite or synthetic ceramic materials) are suspended through the well bore under extremely high pressures into the rock structure in which the petroleum, gas or steam is entrained. Minute fissures in the rock are thereby created and held open by the suspended particles after the liquid has drained off. The petroleum, gas or steam can then flow through the porous zone into the well. Polysaccharides e.g. guar and guar derivatives are the most commonly used water-soluble polymers for hydraulic fracturing.

Aqueous solutions of guar and guar derivatives develop increased viscosity upon the addition of various metal ions. Viscoelastic gels are formed by the chemical linking or cross-linking of two or more polymer chains. The result is a more ordered network structure which increases the effective molecular weight and thereby, the viscosity. The stability of these high viscosity crosslinked gels is dependent on many factors including pH and temperature. The viscosity stability of water-soluble polymer solutions as a function of time and temperature, is crucial for successful applications in the oil field area. Thermal stability is a major factor in selecting a water-soluble polymer for wells having high bottom-hole temperatures. It is well known that crosslinked fracturing fluids degrade with time as a function of temperature and shear, resulting in a loss of viscosity and proppant carrying ability in a short time at temperatures of 250° F. and above.

The observed loss of viscosity as a function of time, temperature and shear, is the result of degradation by several pathways, for example chemical, biological, mechanical and radiation. Biological degradation can be minimized by the proper choice of biocide. Mechanical degradation is the result of applying a critical stress to the gel, resulting in chain scission. Its effect can be minimized by the use of properly engineered surface equipment, etc. Radiation of a polymer solution results in the formation of hydroxyl radicals which abstract hydrogen from the polysaccharide. These radicals trigger oxidation or the formation of intermediates which are easily hydrolyzed. Exposure to radiation, however, cannot usually by controlled and is dependent on time.

There are two chemical pathways of importance. One is hydrolysis of the glycosidic linkage, resulting in scission of the polysaccharide chain. The other is oxidative/reductive depolymerization. Acid catalyzed hydrolysis of the glycosidic bond is well documented. The rate of degradation by glycosidic bond hydrolysis is dependant on reaction time, system pH and temperature. Oxidative/reductive depolymerazations involve the oxidation of the polysaccharide by a radical pathway in the presence of oxygen. Transition metal ions, (e.g. iron) can promote these processes. This thermal degradation of the gels can be minimized by the addition of oxygen scavengers such as sodium thiosulfite, methanol, thiourea and sodium thiosulfate and by avoiding extremely high or low pH conditions. Previously, hydraulic fracturing fluids were pumped at pH's of from 6 to 9.

In order to maintain proppant carrying viscosities in fracturing fluids at this pH in high temperature formations where thermal degradation occurs, polymer loadings were typically increased by 50 to 100 percent. It has been common practice to pump fluids containing 60 pounds of gelling agent per thousand gallons of fluid in order to maintain sufficient viscosity at high temperatures, e.g. 300° F. With the process of the present invention, as little as 30 to 40 pounds of gelling agent are needed. Increased polymer loadings not only increase the cost of the fracturing fluid but also increase the amount of insoluble material or residue remaining in the formation after the fracturing operation is complete. Residue remaining in the formation damages the formation by decreasing the permeability or conductivity of the formation and proppant pack thus reducing oil or gas recovery. The amount of residue remaining in a formation can range from as high as 7.5 percent by weight for unmodified guar down to 2 to 3 percent for hydroxypropylguar and as low as 1 to 2 percent for carboxymethylhydroxypropylguar. Formation damage caused by gel residues is a significant factor affecting productivity of a well especially when greater quantities of gel are used to offset thermal degradation.

SUMMARY OF THE INVENTION

In accordance with the present invention there is provided an improved method for hydraulic fracturing which minimizes the effect of thermal degradation of the gelling polymer in high temperature formations and therefore allows lower polymer gel loadings. The lower gel loadings are more economical and less damaging to the formation. It has been found that the maximum viscosity and thermal stability for crosslinked polymers e.g. guar or derivitized guar polymers occurs at the pH where the cationic charge density is at its maximum. The viscosity and thermal stability of a polymer gel is therefore optimized by maintaining the polymer gel at a pH which optimizes the cationic charge density of the particular polymer.

DESCRIPTION OF THE INVENTION

It has been found that with common zirconium or titanium crosslinked guar or derivitized guar polymers, the maximum viscosity and thermal stability occurs at the pH where the cationic charge density is at a maximum. Guar is typically used in fracturing operations at a pH of 8.5. At this pH, guar has a cationic charge density of 0.24 mEQ/G. At a pH of 10.5 guar has a maximum cationic charge density of 0.57 mEQ/G. For carboxymethylhydroxypropylguar the cationic charge density at pH 8.5 is 0.32 mEQ/G and at pH 10.7 it is at its maximum of 0.765 mEQ/G. It appears that at pHs much above 11.5 the hydrolysis of the base polymer is more prevalent and the thermal stability declines rapidly. The increased thermal stability results in higher viscosities for a longer period of time at high temperatures. In typical fracturing treatments, lower base gel loadings can be used for proppant transport which not only result in a more economical treatment but also result in lower residues and consequently less damage to the formation and proppant pack.

The method of the present invention uses an aqueous gel comprising an aqueous fluid, a gelling agent, and a crosslinking composition which is soluble in the aqueous fluid. The aqueous fluid utilized herein is defined as a water-alcohol solution having from about 0 to 80 percent and preferably from 0 to 40 percent and most preferably from about 0 to 10 percent alcohol by volume of the solution. The preferred alcohols are alkanols having from 1 to 5 carbon atoms. Examples of alcohols believed to be useful in the aqueous fluid include methanol, ethanol, propanol, isopropanol, butanol, isobutanol, pentanol, furfuryl alcohol, ethylene glycol and ethoxylated derivatives thereof.

The aqueous fluid is used to solvate the gelling agent. The solvated gelling agent is referred to hereinafter as a "base gel". The pH of the aqueous fluid can be adjusted, if necessary, to render the fluid compatible with the crosslinking agent used to crosslink the solvated gelling agent. The pH adjusting material can be added to the aqueous fluid before, after, or during the addition of the gelling agent to the aqueous fluid. The pH can be adjusted using most acids or bases. Examples include sodium bicarbonate, sodium carbonate, sodium hydroxide, acetic acid, sodium diacetate, adipic acid, formic acid, fumaric acid, hydrochloric acid, or monosodium-phosphate. The optimum pH will depend on which gelling agent is used and will generally be above about 9.5, preferably above about 10 and most preferably above about 10.5. The pH can range from about 9.5 to about 13 preferably from about 10 to about 12 and most preferably from about 10.5 to about 11.5.

The gelling agent useful in the present invention is selected from solvatable polysaccharides having molecular weights of at least 100,000. Examples of polysaccharides useful herein include the galactomannan gums, glucomannan gums and their derivatives. The galactomannan gums and the glucomannan gums can also be reacted with hydrophilic constituents to thereby produce gelling agents useful herein. Preferred solvatable polysaccharides useful herein have molecular weights in the range from about 200,000 to about 3,000,000.

Guar gum, locust bean gum, karaya gum, sodiumcarboxymethylguar, hydroxyethylguar, sodium carboxymethelhydroxyethylguar, hydroxypropylguar and sodium carboxymethylhydroxypropylguar are examples of gelling agents useful herein.

The preferred gelling agents are guar gum, and derivatized guar including hydroxypropylguar, carboxymethylguar and carboxymethylhydroxypropylguar. The most preferred gelling agent is sodium carboxymethylhydroxypropylguar.

The gelling agent is mixed with the aqueous fluid in any suitable mixing apparatus in amounts of from 10 pounds to 100 pounds per thousand gallons of aqueous fluid, preferably from about 15 to 60 pounds per thousand gallons of aqueous fluid and most preferably from about 20 to 50 pounds per thousand gallons of aqueous fluid depending on the temperature environment. The advantages of the present invention are most apparent at bottom hole temperatures above 200° F. preferrably above 250° F. and most preferably above 300° F.

Crosslinking agents useful herein can include transition metal compounds especially zirconium and titanium compounds. Preferred crosslinking agents include those with zirconium in the +4 oxidation state and are referred to as zirconium salts or chelates. Examples include zirconium triethanolamine complexes, zirconium acetylacetonate, zirconium lactate, zirconium carbonate, zirconium diisopropylamine lactate and chelates of an organic alpha-hydroxycarboxyllic acid and zirconium. The crosslinking agent is admixed with the base gel in an amount in the range of from 0.01 pound to about 10 pounds per thousand gallons of aqueous fluid, preferably from about 0.025 to about 2.5 pounds per thousand gallons of aqueous fluid. The crosslinking agent can be admixed with the base gel in any suitable mixing apparatus and can be a particulate solid or a liquid solution in a suitable solvent such as water or an alcohol.

The propping agent can be any material which has been or is found to be suitable for propping a fracture in a subterranean formation. The propping agent can comprise, for example, sand, graded gravel, glass beads, ceramics, sintered bauxite, resin-coated sand or the like. The propping agent can be admixed with the fracturing fluid in an amount from about 0 pounds per gallon of aqueous liquid up to as many pounds of proppant material as may be pumped. Typical amounts range from about ¼ pound to about 20 pounds per gallon of fracturing fluid.

To further illustrate the present invention, the following examples are provided. The examples are not intended to limit the scope of the invention.

EXAMPLES

The base gel was prepared by mixing "CLAY TREAT 2C ™" KCl substitute in tap water at a rate of 1 gallon/1000 gallons (GPT). To this solution the "J-22L ™" gel was added to the water at a rate of 40 lb/1000 gallons and allowed to fully hydrate to a point of 30 to 34 cP viscosity at 511 sec$^{-1}$ measured by a Fann 35 viscometer fitted with a R1-B1 rotor-bob combination at 300 rpm. While stirring in a warring blender, the pH of the solvated gel solution was adjusted to the desired level using NaOH. As the solution was stirred the "GEL MASTER ™" gel stabilizer was added. The crosslinker ("CL-14 ™" or "CL-22 ™") was then added to the solution and allowed to stir for a period of 30 seconds to allow complete dispersion of the crosslinker in the solution.

At this time 40 cc's of the gel was poured into a "FANN 50C" sample cup and placed on the "FANN 50C" with the oil bath preheated to 300° F. for rapid heating of the sample to be tested. After loading the sample on the machine, the pressure was raised to 400 psi and the oil bath raised to contact the sample cup. The "FANN 50C" was operated with a R1-B5X rotor-bob combination. At 118 rpm, this combination provided a shear history of 100 sec$^{-1}$. After the bath was raised the rpm was increased to 118 rpm and maintained until the sample was at 95+% of the test temperature. At this time a rheogram scan of 150, 125 100 and 75 sec$^{-1}$ was performed in order to characterize the fluid. Following this initial rheogram scan, the rpm was returned to 118 rpm. Other rheogram scans were performed at intervals of 30 minutes during the remaining course of the test.

"J-22L ™" gelling agent is a sodium carboxymethylhydroxypropylguar gelling agent slurried in diesel and is available from the Western Company of North America.

"CLAY TREAT 2C ™" is a clay control product which is used as a substitute for KCl. The product is a proprietary quarternary ammonium chloride and substitute is available from the Western Company of North America.

"GEL MASTER ™" is a proprietary high temperature solid gel stabilizer and is available from the Western Company of North America.

"CL-14 ™" and "CL-22 ™" crosslinking agents are zirconium chelate crosslinking agents and are available from the Western Company of North America.

"FRAC-CIDE20 ™" biocide is a non-ionic biocide available from the Western Company of North America.

All tests were conducted at 300° F. under a continuous shear of 100 sec$^{-1}$. In all cases sodium carboxymethylhydroxypropylguar was used at a loading of 40 pounds per 1000 gallons of tap water with 10 pounds per 1000 gallons of "GEL MASTER" gel stabilizer, 1 gallon per thousand gallons of "CLAY TREAT 2C ™" KCl substitute and 0.3 pounds per 1000 gallons of "FRAC-CIDE 20 ™" biocide.

TABLE I

APPARENT VISCOSITY IN cP AT 100 SEC$^{-1}$ OF 40 POUNDS OF "J-22L ™" PER 1000 GALLONS OF TAP WATER - 1 GAL/1000 GAL "CL-22 ™" AT 300° F.

| TIME HOURS | pH 8.0 | pH 9.0 | pH 10.0 | pH 11.0 |
|---|---|---|---|---|
| 0.0 | 231 | 1018 | 2055 | 1564 |
| 0.5 | 163 | 773 | 1428 | 648 |
| 1.0 | 109 | 644 | 1203 | 436 |
| 1.5 | 69 | 523 | 1028 | 339 |
| 2.0 | 46 | 425 | 899 | 273 |
| 2.5 | | 349 | 799 | 234 |
| 3.0 | | 282 | 709 | 201 |
| 3.5 | | 223 | 634 | 175 |
| 4.0 | | 180 | 570 | 155 |
| 4.5 | | 140 | 516 | 136 |
| 5.0 | | 109 | 469 | 125 |
| 5.5 | | 87 | 416 | 113 |
| 6.0 | | 71 | 381 | 101 |
| 6.5 | | 57 | 342 | 93 |
| 7.0 | | 48 | 306 | 87 |
| 7.5 | | | 274 | 80 |
| 8.0 | | | 220 | 73 |
| 8.5 | | | 197 | 69 |
| 9.0 | | | 178 | 64 |
| 9.5 | | | 157 | |
| 10.0 | | | | |

Table I shows apparent viscosities of a 40 pound per 1000 gallon gel at various pH's while using 1 gallon per 1000 gallons of "CL-22 ™" crosslinking agent. The results show that the maximum apparent viscosity is near pH 10 and is between 2 and 6 times greater at pH 10 than at pH 9. The viscosity advantage is more apparent at times longer than about 4 hours.

TABLE II

APPARENT VISCOSITY IN cP AT 100 SEC$^{-1}$ OF 40 POUNDS "J-22L ™" PER 1000 GALLONS OF TAP WATER - 1 GAL/1000 GAL. "CL-14 ™" AT 300° F.

| TIME HOURS | pH 9.0 | pH 10.0 | pH 10.5 | pH 11.0 | pH 12.0 |
|---|---|---|---|---|---|
| 0.0 | 285 | 892 | 1264 | 1233 | 1782 |
| 0.5 | 292 | 708 | 1207 | 1025 | 1107 |
| 1.0 | 280 | 614 | 1607 | 921 | 820 |
| 1.5 | 262 | 551 | 1020 | 850 | 650 |
| 2.0 | 244 | 504 | 926 | 785 | 532 |
| 2.5 | 222 | 466 | 862 | 720 | 448 |
| 3.0 | 205 | 433 | 779 | 668 | 358 |
| 3.5 | 188 | 401 | 735 | 616 | 327 |
| 4.0 | 169 | 374 | 674 | 571 | 284 |
| 4.5 | 153 | 354 | 628 | 532 | 249 |
| 5.0 | 138 | 330 | 578 | 503 | 218 |
| 5.5 | 122 | 309 | 536 | 474 | 191 |
| 6.0 | 110 | 294 | 497 | 451 | 169 |
| 6.5 | 99 | 272 | 463 | 425 | 151 |
| 7.0 | 88 | 253 | 434 | 404 | 136 |
| 7.5 | 80 | 240 | 402 | 374 | 126 |
| 8.0 | 70 | 226 | 374 | 357 | 115 |
| 8.5 | 62 | 210 | 345 | 333 | 106 |
| 9.0 | 56 | 196 | 317 | 315 | 101 |
| 9.5 | 49 | 183 | 293 | 295 | |
| 10.0 | | 169 | | 276 | |

Table II shows the apparent viscosities of the 40 pound per 1000 gallon gel at various pH's using "CL-14 ™" crosslinking agent. Again, as with "CL-22 ™" crosslinker in Table I, there is a significant and unexpected increase in the viscosity of the fluid both initially and after exposure to the 300° F. temperature conditions as the pH is increased from 9 to 10.5 or 11.0. The maximum viscosity appears to be at a pH of about 10.5

TABLE III

APPARENT VISCOSITY IN cP AT 100 SEC$^{-1}$ OF 40 POUNDS OF "J-22L ™" PER 1000 GALLONS OF TAP WATER AT pH 10.0 AND 300° F. - VARIED CROSSLINKER LOADINGS

| TIME, HOURS | 0.5 GPT "CL-22 ™" | 1.0 GPT "CL-22 ™" | 2.0 GPT "CL-22 ™" | 3.0 GPT "CL-22 ™" |
|---|---|---|---|---|
| 0.0 | 1098 | 2055 | 217 | 144 |
| 0.5 | 618 | 1428 | 145 | 100 |
| 1.0 | 456 | 1203 | 140 | 90 |
| 1.5 | 354 | 1028 | | |
| 2.0 | 287 | 899 | | |
| 2.5 | 239 | 799 | | |
| 3.0 | 203 | 709 | | |
| 3.5 | 176 | 634 | | |
| 4.0 | 152 | 570 | | |
| 4.5 | 130 | 516 | | |
| 5.0 | 113 | 469 | | |
| 5.5 | 99 | 416 | | |
| 6.0 | 88 | 381 | | |
| 6.5 | 78 | 342 | | |
| 7.0 | 68 | 306 | | |
| 7.5 | 62 | 274 | | |
| 8.0 | 59 | 244 | | |
| 8.5 | 54 | 220 | | |
| 9.0 | 50 | 197 | | |
| 9.5 | 46 | 178 | | |
| 10.0 | | 157 | | |

Table III shows the apparent viscosities of a 40 pound per 1000 gallon gel at a pH adjusted to 10 with NaOH at various loadings of "CL-22 TM" crosslinking agent. The tests show that a loading of about 1.0 gal per thousand gallons gives the maximum apparent viscosity.

TABLE IV

APPARENT VISCOSITY IN cP AT 100 SEC$^{-1}$ OF 40 POUNDS "J-22L TM" PER 1000 GALLONS OF TAP WATER - 1 GAL/1000 GAL. CL-14 TM AT 300° F.

| TIME, HOURS | 0.5 GPT "CL-14 TM" | 0.75 GPT "CL-14 TM" | 1.0 GPT "CL-14 TM" | 2.0 GPT "CL-14 TM" |
|---|---|---|---|---|
| 0.0 | 792 | 1570 | 1782 | 135 |
| 0.5 | 211 | 564 | 1107 | 98 |
| 1.0 | 134 | 331 | 820 | 88 |
| 1.5 | 104 | 154 | 650 | |
| 2.0 | 89 | 96 | 532 | |
| 2.5 | 79 | 65 | 448 | |
| 3.0 | 61 | | 385 | |
| 3.5 | 39 | | 327 | |
| 4.0 | | | 284 | |
| 4.5 | | | 249 | |
| 5.0 | | | 218 | |
| 5.5 | | | 191 | |
| 6.0 | | | 169 | |
| 6.5 | | | 151 | |
| 7.0 | | | 136 | |
| 7.5 | | | 126 | |
| 8.0 | | | 115 | |
| 8.5 | | | 106 | |
| 9.0 | | | 101 | |
| 9.5 | | | | |
| 10.0 | | | | |

Table IV shows the apparent viscosities of a 40 pound per 1000 gallon gel at a pH of 12 at various loadings of "CL-14 TM" crosslinking agent. The tests show, as in Table III, that a loading of 1.0 gallon per thousand gallons gives the maximum apparent viscosity.

These results clearly illustrate the improved performance which can be obtained by the use of the claimed method.

While particular embodiments of the invention have been described, it is to be understood that such descriptions are presented for purpose of illustration only and that the invention is not limited thereto and that reasonable variations and modifications, which will be apparent to those skilled in the art, can be made without departing from the spirit or scope of the invention.

What is claimed is:

1. A process for fracturing a subterranean formation which comprises introducing into said formation at a flow rate and pressure sufficient to produce a fracture in said formation, a fluid comprised of an aqueous gel comprising an aqueous fluid, a gelling agent and a transition metal chelate crosslinking agent wherein said gelling agent is selected from the group consisting of guar, hydroxypropylguar, carboxymethylguar and carboxymethylhydroxypropylguar, wherein said crosslinking agent is present in an amount of at least 0.0005 percent by weight of said aqueous gel and wherein the pH of said fluid is maintained essentially at the pH which provides the maximum cationic charge density in said gelling agent.

2. The process of claim 1 wherein said fluid is maintained at a pH of from about 10 to about 12.

3. The process of claim 1 wherein said fluid is maintained at a pH of from about 10.5 to about 12.

4. The process of claim 1 wherein the crosslinking agent is a zirconium or titanium chelate.

5. The process of claim 1 wherein the crosslinking agent is a zirconium chelate with zirconium in the +4 oxidation state.

6. The process of claim 1 wherein the crosslinking agent is selected from the group consisting of zirconium triethanolamine complexes, zirconium (IV) acetylacetonate, zirconium lactate, zirconium carbonate, zirconium diisopropylamine lactate and chelates of an organic alpha-hydroxycarboxyllic acid and zirconium.

7. The process of claim 1 wherein the crosslinking agent is zirconium lactate or zirconium triethanolamine complex.

8. The process of claim 1 wherein the crosslinking agent is present at from about 0.01 to about 10 pounds per thousand gallons of aqueous fluid.

9. The process of claim 1 wherein the crosslinking agent is present at from about 0.025 to about 2.5 pounds per thousand gallons of aqueous fluid.

10. The process of claim 1 wherein the gelling agent is carboxymethylhydroxypropylguar.

11. The process of claim 1 wherein the gelling agent is present at from about 15 to about 60 pounds per thousand gallons of aqueous fluid.

12. The process of claim 1 wherein said fluid also comprises a propping agent.

13. A process for fracturing a subterranean formation which comprises introducing into said formation, at a flow rate and pressure sufficient to produce a fracture in said formation a fluid comprised of an aqueous gel and a propping agent, said aqueous gel comprising an aqueous fluid, a guar or derivitized guar gelling agent and a zirconium chelate crosslinking agent wherein said gelling agent is present at from about 15 to about 60 pounds per thousand gallons of aqueous fluid, said crosslinking agent is present at from 0.01 to about 10 pounds per thousand gallons of aqueous fluid, wherein the bottom hole temperature of said subterranean formation is above 200° F., and wherein the pH of said fluid is maintained between about 10.5 and about 12.

14. The process of claim 13 wherein the zirconium chelate is zirconium lactate or zirconium triethanolamine complex.

* * * * *